Inventor:
Benjamin S. Pritchard,
by Charles W Helzer
His Attorney.

Fig. 3.
Fig. 3a.
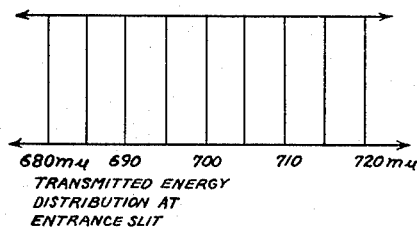
TRANSMITTED ENERGY
DISTRIBUTION AT
ENTRANCE SLIT
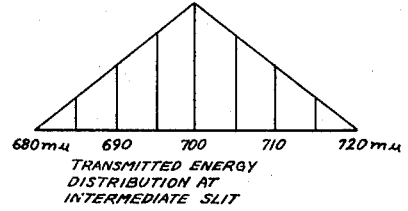
TRANSMITTED ENERGY
DISTRIBUTION AT
INTERMEDIATE SLIT
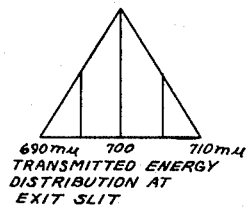
TRANSMITTED ENERGY
DISTRIBUTION AT
EXIT SLIT
Inventor:
Benjamin S. Pritchard,
by Charles W. Helzer
His Attorney.

Dec. 23, 1958 B. S. PRITCHARD 2,865,246
SPECTROPHOTOMETER
Filed Oct. 14, 1953 5 Sheets-Sheet 4

Inventor:
Benjamin S. Pritchard,
by Charles W Helzer
His Attorney.

Dec. 23, 1958  B. S. PRITCHARD  2,865,246
SPECTROPHOTOMETER
Filed Oct. 14, 1953  5 Sheets-Sheet 5
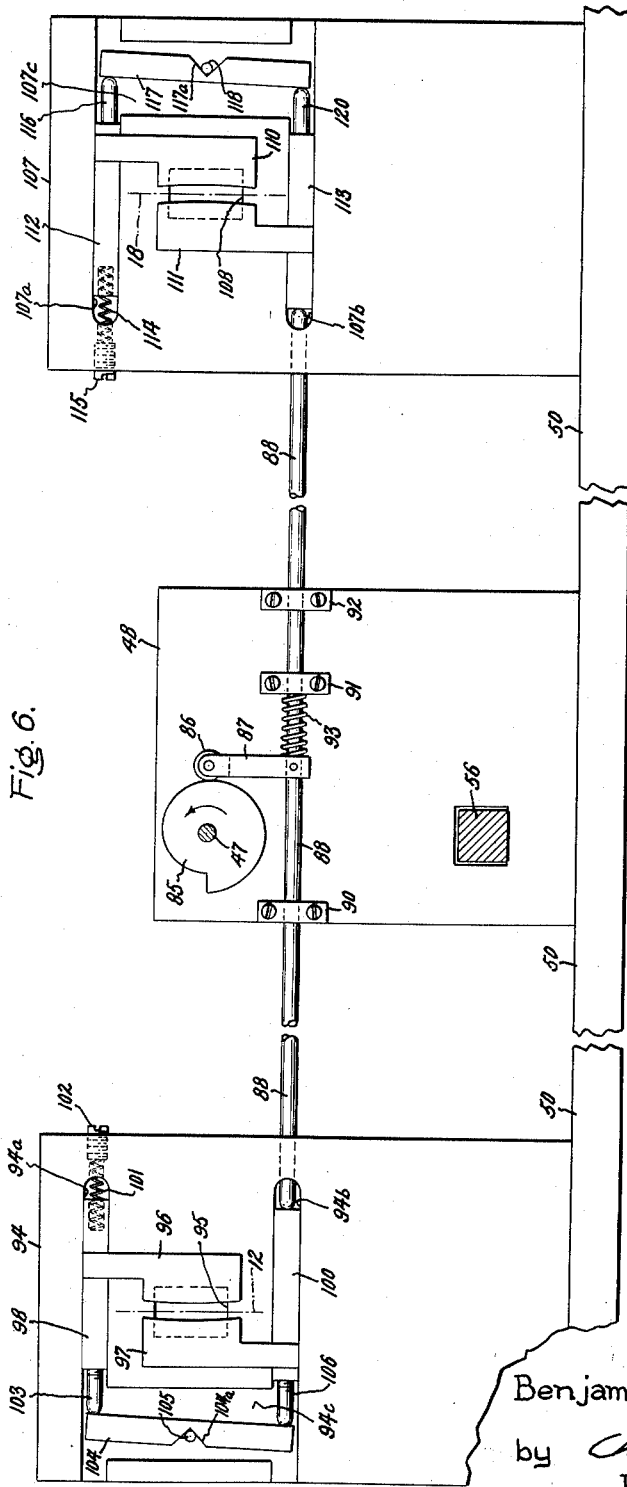
Inventor:
Benjamin S. Pritchard,
by Charles W. Helzer
His Attorney.

United States Patent Office 2,865,246
Patented Dec. 23, 1958

2,865,246

SPECTROPHOTOMETER

Benjamin S. Pritchard, Schenectady, N. Y., assignor to General Electric Company, a corporation of New York Application October 14, 1953, Serial No. 386,059

3 Claims. (Cl. 88—14)

This invention relates to spectrophotometers of the flickering beam type, and more particularly to an improved optical system for such instruments.

Prior spectrophotometers, although generally satisfactory, have suffered from lack of sensitivity, which limited their usefulness and accuracy when measuring characteristics of samples having low transmission or reflectance. Therefore, a primary object of the invention is to provide a spectrophotometer embodying an improved optical system, whereby the sensitivity of the instrument is greatly increased.

Another object is to provide in a spectrophotometer means for producing monochromatic light of constant high spectral purity, and of greater intensity than heretofore possible.

Another object of the invention is to provide an optical system for a spectrophotometer, which minimizes the possibility of error and faulty operation of the instrument due to misalignment of the optical system.

The foregoing objects are attained in the spectrophotometer of the invention, which comprises essentially monochromating apparatus for producing substantially monochromatic light, and photometering apparatus for causing the monochromatic light to be directed alternately on a sample and a standard and for comparing the amount of light reflected from or transmitted by the sample and standard. The monochromating portion of the spectrometer comprises a light source, an entrance slit, an intermediate slit, and an exit slit, with spectrum forming means located between the entrance slit and the intermediate slit and between the intermediate slit and the exit slit. The widths of all the slits are adjustable, and the intermediate slit is movable to cause the exit slit to transmit a band of light whose center frequency varies progressively throughout the spectrum. The widths of the three slits are varied simultaneously with the movement of the intermediate slit, and the entrance and exit slits control the spectral width of the band of light transmitted by the exit slit. The ratios of the widths of the three slits are such that the intensity of the band of substantially monochromatic light transmitted through the exit slit is greater than has heretofore been possible, and full advantage is taken of the dispersive qualities of both spectrum forming means.

The photometering portion of the instrument comprises a photometering prism, which plane polarizes the band of light transmitted through the monochromator exit slit, a prism for splitting the polarized light into two diverging beams plane polarized at right angles to each other, and a rotating dichroic sheet polarizer for causing the two beams to flicker in opposite phase. The flickering beams of light are directed onto a sample and a standard, and the light transmitted by or reflected from the sample and standard, depending on whether they are arranged for the measurement of transmission or reflectance, is received by an integrating sphere. A light conduit transmits the integrated light from the sphere to a photocell, and any variation in the output of the photocell at flicker frequency is amplified and used to vary the position of the photometering prism until there is no fluctuation.

The novel features of the monochromating section of the device caused a greatly increased amount of light flux to strike the sample and standard, and the use of means to actually conduct the integrated light from the sphere to the photocell causes the photocell to receive a far greater portion of the light striking the sample and standard than was previously possible. Various other improvements in the photometering section of the apparatus contribute to the reduction of spurious signals in the photocell output, and thus increase the sensitivity of the spectrophotometer.

Further features and advantages of the invention will become apparent from the following description of one embodiment thereof, taken in conjunction with the accompanying drawings, in which Fig. 1 is a diagram of a spectrophotometer embodying the invention;

Figs. 2 and 2a are diagrams illustrating the transmission of light through the slits of the monochromating section of a spectrophotometer, when the slits are arranged in the manner heretofore known;

Figs. 3 and 3a are diagrams showing the transmission of light through the slits of the monochromating section of the spectrophotometer of the present invention;

Fig. 6 is a view in elevation of the mechanism which controls the widths of the entrance and exit slits.

Figure 1:
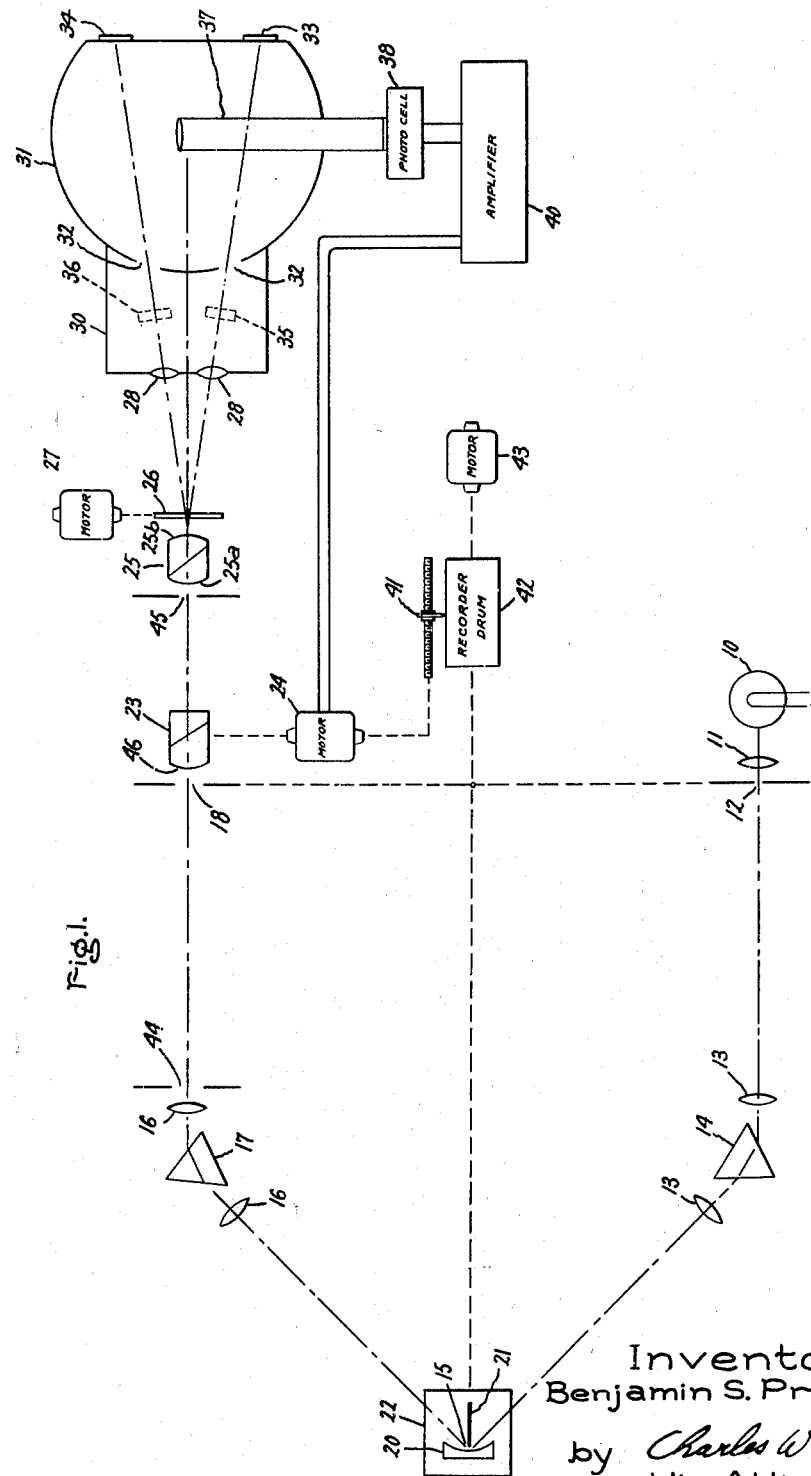

Fig. 1 illustrates in diagrammatic form a spectrophotometer of the recording type, which embodies the present invention. Light from an incandescent lamp 10, which may be of the low-voltage compact-filament type, passes through a condensing lens 11, a variable width entrance slit 12, collimating lenses 13 and a first spectrum forming prism 14, a movable variable width intermediate slit 15, collimating lenses 16 and a second spectrum forming prism 17, and a variable width exit slit 18. The intermediate slit 15 comprises a mirror 20 and a blade 21, both mounted on a movable carriage 22 with the blade 21 also movable relative to the mirror to vary the width of the slit. The carriage 22 may be reciprocated in such a manner that the exit slit 18 transmits a band of substantially monochromatic light whose center frequency varies progressively throughout the spectrum. The carriage 22, the blade 21, the entrance slit 12 and the exit slit 18 are mechanically interconnected to maintain the width of the band of light transmitted by the exit slit constant throughout the spectrum, as will be later described in detail.

The substantially monochromatic band of light transmitted through the exit slit 18 passes into a photometric prism 23 of the conventional Nicol or Rochon type, which plane polarizes the beam of light. The photometric prism 23 is so mounted that it may be rotated on its optic axis by a motor 24 in a direction depending on the phase of the alternating current in the armature compared to the phase of the current in the field. The prism may be rotated by the motor through any convenient well-known means, such as a worm and ring gear (not shown). The plane polarized light leaving the photometric prism 23 then passes through a Wollaston prism 25, where it is separated into two beams plane polarized at right angles to each other, and the two beams pass through a flicker device, which causes the beams emerging therefrom to vary in intensity from minimum to maximum in opposite phase.

The flicker device comprises a dichroic sheet polarizer 26, such as sold under the trademark Polaroid, which is rotated at 30 cycles per second by an 1800 R. P. M. synchronous motor 27, whose field is energized by the 60-cycle alternating current which energizes the field of the motor 24. The motor 27 may be connected to the sheet polarizer 26 throuph any well-known power transmission means, such as a belt and pulley arrangement, whereby the sheet polarizer may be rotated at the same speed as the motor. Each beam passes through two cycles from maximum to minimum for every revolution of the sheet polarizer, and provides a flicker frequency of 60 cycles per second.

The two flickering beams pass through lenses 28 mounted in openings in the front of a transmission compartment 30, and enter an integrating sphere 31 through openings 32, where they strike targets 33 and 34. If it is desired to measure the reflectance of a sample, one of the targets may be the sample and the other a standard; if it is desired to measure the transmission of a sample, the targets 33 and 34 will be alike and the sample and standard placed at 35 and 36 in the transmission compartment 30 in the paths of the flickering beams. The flickering beams encountering the two targets are reflected in accordance with the reflection characteristics of the target surfaces at the particular wave length of monochromatic light falling on them. If like targets 33 and 34 are used and the sample and standard placed in the transmission compartment, the beams will vary in accordance with the transmission characteristics of the sample and standrad at the particular wave length of light passing through them.

Any unbalance in the total light reflected from or transmitted through the sample and standard during a complete cycle will produce a total variation of light in the integrating sphere at the 60 cycle per second flicker frequency.

Extending into the integrating sphere to a point slightly above the center of the sphere and substantially on a diameter thereof is a light conduit pipe 37, which may be a polished cylindrical rod of a transparent synthetic resin, such as a methyl methacrylate, such as sold under the trademark Lucite or the trademark Plexiglas. A photocell 38 is mounted at the end of the light conduit 37 outside the integrating sphere, and receives the integrated light from the sphere which has been transmitted by the light conduit 37.

The output current of the photocell 38, which includes the 60 cycle flicker frequency along with any stray fluctuations at other frequencies resulting from the characteristics of the targets, is amplified by a high gain amplifier 40, and the amplified current is then fed into the armature of motor 24. Since the field of the motor 24 receives 60-cycle alternating current, the motor will respond only to frequencies at or near the flicker frequency present in the output of the amplifier 40; that is, the motor acts as a selective device which responds to the frequency of the current which excites its field. The motor 24 rotates and moves the photometric prism 23 until the prism has varied the relative intensity of the two beams from the Wollaston prism by an amount sufficient to compensate for the variation in the light reflected from each target, at which time there is no fluctuation of light in the integrating sphere at flicker frequency and, therefore, there will be no flicker frequency in the output of amplifier 40 and the motor 24 will stop. The direction in which the motor 24 rotates depends on the phase of the 60-cycle component in the amplifier output, which reverses with the reversal of the relative intensity of the reflected light from the two beams. For example, if there is unbalance such that the light reflected from target 33 is greater than that from target 34, the resultant 60-cycle component of current will have one phase, as compared to the 60-cycle current flowing in the field windings of motor 24, whereas, if the opposite condition takes place, and the light reflected from target 33 is less than that from target 34, the 60-cycle output current will have the opposite phase and the motor 24 will turn in the opposite direction. It is necessary to adjust the phase initially so that the motor 24 turns in the proper direction and with maximum torque.

As the motor 24 rotates the photometric prism 23, it also changes the position of a marking device 41, such as a stylus or pen, which makes an impression or mark on a record secured to a rotating recorder drum 42. The rotating drum 42 is driven through proper connecting means by a wave length motor 43, which also controls the movement of the intermediate slit 15 and the width adjusting mechanisms of all three slits, and thus the marking device produces a continuous graph of the reflection or transmission characteristics of a given sample relative to a standard at the various wave lengths throughout the spectrum.

A substantially monochromatic image of the filament of the light source 10 is focused on the targets 33 and 34, and images of the filament and the slits are formed at various points throughout the optical system. A first image of the filament is formed near the collimating lenses 13 by the condenser lens 11, and a second image of the filament is formed on an aperture 44 near the collimating lenses 16 by the mirror 20 in the intermediate slit. In this embodiment of the spectrophotometer, the mirror 20 has a concave reflecting surface of the proper curvature to form the second image of the filament at the aperture 44. It is apparent that the concave mirror 20 may be replaced by a plane mirror with a lens of the proper power placed between the prism 14 and the mirror. However, in the preferred form of the device, a focusing mirror is used in preference to a lens, because less light is lost by internal reflections and better symmetry is maintained in the system. A third image of the filament is formed at an aperture 45 in front of the Wollaston prism 25 by a lens 46 cemented to the front surface of the photometric prism 23, and the fourth and final images of the filament are formed on the targets 33 and 34 by the lenses 28, through which the two flickering beams pass.

In addition, in the process of monochromating the white light from the filament of light source 10, images of the slits are formed throughout the system. An image of the entrance slit is formed at the intermediate slit by the collimating lenses 13 but, because of the dispersive action of the first prism 14, the image of the entrance slit appears as a spectral band. Thus, the position of the intermediate slit 15 determines the center frequency of the spectral band which passes through the slit. An image of the intermediate slit 15, which is further dispersed by the second prism 17, is formed on the exit slit 18 by the collimating lenses 16, and the exit slit 18 is imaged on the lenses 28 by spherical refracting surfaces 25a and 25b formed on the Wollaston prism 25.

If means for imaging the exit slit 18 on the double lenses 28 is placed between the flicker device and the double lenses, undesirable surface reflections result, and this same result is obtained if the focusing means is placed between the Wollaston prism and the flicker device. If, in order to eliminate the surface reflections, a glass lens is cemented to the second surface of the prism, the two beams emerging from the prism may be unbalanced due to unequal internal reflection losses. This difficulty could be eliminated by also cementing a piece of glass on the first surface of the prism, but strains arising in the first piece of glass, with resultant birefringence, might well destroy the perfect polarizing properties of the Wollaston prism. Therefore, in the present invention convex refracting surfaces are ground on the calcite prism itself, which results in improved sensitivity in the instrument.

A known flicker device previously used in spectrophotometers of this type comprises a rotating Rochon prism of conventional type, whose alignment in the system is quite critical. The two flickering beams leaving such a prism are displaced sideways from the optic axis of the system, as well as being divergent, and rotate at 30 cycles per second. This condition introduces several possibilities for the generation of spurious signals. For example, because the beam which strikes the sample is rotating, a spurious 30-cycle signal will be introduced if the sample is non-uniform in transmission or reflectance across its surface, and the same type of signal may be introduced by dirt on the two lenses following the prism. In addition, the effect of the rotation of the beams cannot be completely compensated for because each wave length of light is deviated differently by the prism. These difficulties are obviated in the present invention by using a rotating dichroic sheet polarizer such as sold under the trademark Polaroid. The rays emerging from the polarizer do not rotate, and thus the sources of 30-cycle noise are eliminated. In addition, a dichroic sheet polarizer is much less expensive to procure than a Rochon prism, and the sheet may be larger than is convenient with a prism.

It has also been customary in the spectrophotometers known heretofore to provide an aperture in the wall of the integrating sphere covered by a diffusing medium, through which the integrated light from the sphere passes and falls on a photocell. In the present invention the amount of light reaching the photocell has been greatly increased by using a light conduit to collect and conduct light from the interior of the sphere to the photocell. A preferred form of light conduit comprises a polished Lucite rod, one of the well-known optical properties of which is that light entering one end of the rod is conducted therethrough with very little loss and passes out the other end of the rod. The rod, which extends through the aperture into the sphere to a point above the center of the sphere, is located substantially on a diameter of the sphere, and, of course, is positioned so as not to intercept either of the two flickering beams. The photocell is located adjacent the outer end of the Lucite rod in such position that substantially all of the light leaving the rod falls on photocell. Thus, approximately twice as much light reaches the photocell as is the case when the aperture in the sphere is covered by a diffusing medium such as opal glass.

One of the principal features of the present invention resides in the arrangement of the slits, which provide a band of substantially monochromatic light to the photometering prism. It has been customary in previously known instruments of this type to have the relative widths of the entrance, intermediate and exit slits so adjusted that the intermediate and exit slits control the spectral widths of the band of light transmitted through the exit slit, as well as the amount of light of each of the transmitted wave lengths. This meant that the intermediate and exit slits were generally of the same width, and substantially narrower than the entrance slit, and a generally accepted ratio was one in which the entrance slit was three times as wide as the intermediate and exit slits. Attention is drawn to the fact that, in an instrument of the present form, wherein the intermediate slit is formed between a blade and a mirror and the light incident on the slit is not normal thereto, the effective width of the slit is not the actual measured width between the mirror and the blade. The mirror effectively doubles the width of the slit, and the inclination of the slit with respect to the incident light reduces the effective slit width. Therefore, the effective width of the intermediate slit is equal to twice the measured width multiplied by the sine of the angle of incidence of the light on the slit, as is well-known in the art. As used in this specification, terms such as "slit width" and the like are taken to mean "effective slit width" because the actual slit width has little or no significance in an operational sense.

Figure 2:
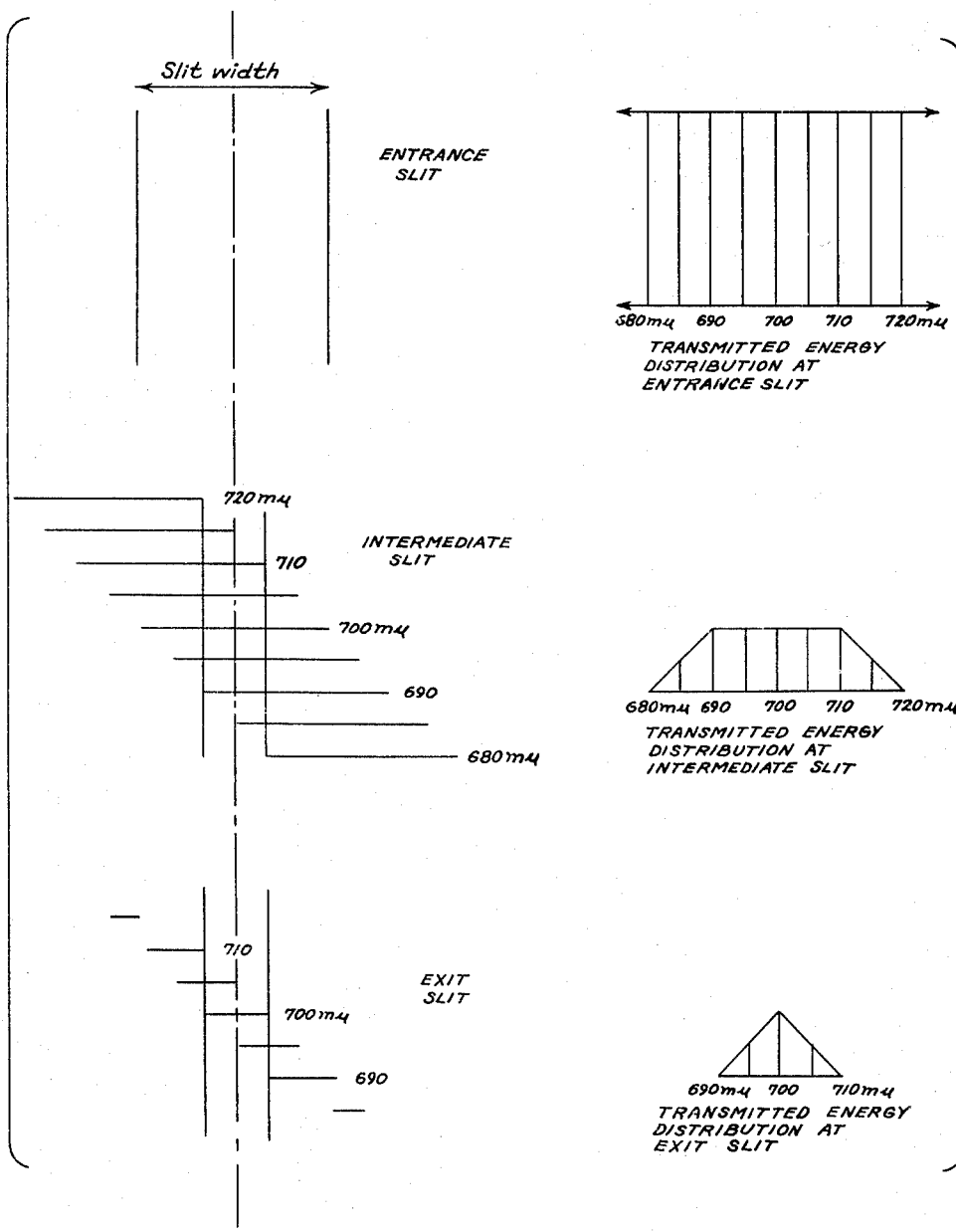

The transmission of light through slits arranged in the manner heretofore customary is ilustrated in Fig. 2, which shows in diagrammatic form the locations of the slit images on the succeeding slit for the various wave lengths of light, and in Fig. 2a, which shows the distribution of the energy transmitted through each of the slits. In Fig. 2 the vertical lines represent the slits, with the ratio of the widths of the entrance, intermediate and exit slits being 3:1:1, and the horizontal lines drawn across each slit represents the locations of the images of the preceding slit for the various wave lengths of light, when dispersing prisms are located between the entrance and intermediate slits and between the intermediate and exit slits. It is assumed, for purposes of illustration, that the intermediate slit is so positioned as to cause the central wave length of the band of light transmitted through the exit slit to be 700 millimicrons. It is seen from Figs. 2 and 2a that, when the relative widths of the slits are as shown and the dispersed images of the entrance slit falling on the intermediate slit are three times as wide as the intermediate slit, the intermediate slit transmits a spectrally broad band of light, in which the amount of energy at the various wave lengths is limited by the width of the intermediate slit. The dispersed images of the intermediate slit fall on the exit slit, which further restricts the band of frequencies transmitted therethrough. However, because the exit slit is no narrower than the intermediate slit, it does not decrease the amount of energy of the center wave length of the band of transmitted light. If the width of the intermediate slit is increased, more light of those wave lengths lying on each side of the center wave length of the band will be transmitted through the exit slit, and the spectral width of the transmitted band will be increased; if the width of the intermediate slit is decreased, the amount of light of the various wave lengths transmitted through the exit slit will be decreased and the spectral width of the band decreased. Therefore, the width of the intermediate slit, when using the 3:1:1 slit width ratio illustrated in Fig. 2, must be controlled with great accuracy. It is also apparent that with this slit width ratio the dispersive qualities of the prism located between the entrance and intermediate slits are completely wasted so far as contributing to the final dispersion is concerned, and the entrance slit and first prism serve only to throw away a large amount of the light far removed from the pass band.

It is well known that the index of refraction of glass changes with the wave length of the incident light, and it is because of this fact that a prism disperses white light to form a spectrum. However, the index of refraction does not change linearly with wave length; that is, if the index of refraction is expressed in terms of the wavelength of the incident light, the first derivate of the function is not a constant. Therefore, in order to maintain the spectral width of the band of light transmitted through the exit slit constant throughout the spectrum, it is necessary to vary the widths of the slits as the center frequency of the transmitted band of light changes. It was pointed out above, with reference to Figs. 2 and 2a, that the width of the intermediate slit controls the width of the band of light transmitted through the exit slit when using a 3:1:1 slit width ratio, and therefore, it is apparent that the width of the intermediate slit must be controlled very precisely to maintain the transmitted band of light of constant width. Heretofore, this has been accomplished by the use of cams, whose precise construction was both costly and time consuming.

In the present invention the ratio of the widths of the entrance, intermediate, and exit slits may vary between approximately 2:2:2 and 2:4:2, as compared to the constant 3:1:1 ratio previously used. The function of the slits, when arranged with a 2:2:2 slit width ratio and with the same dispersing prisms previously used, is illustrated by Fig. 3, which is similar to Fig. 2 and shows the various locations of the slit images on the succeeding slit, and by Fig. 3a, which is similar to Fig. 2a and shows the energy distribution for the various wave lengths at each of the slits. It is seen from Fig. 3 that with this arrangement full advantage is taken of the dispersive qualities of the prism between the entrance and intermediate slits, and, therefore, the energy distribution curve at the intermediate slit does not have a flat top, as was the case with the prior arrangement shown in Figs. 2 and 2a, but is peaked at the center wave length of the transmitted band. The dispersed images of the intermediate slit fall on the exit slit, which transmits approximately twice as much light as with the previous arrangement, and with the same degree of spectral purity. It is also seen that with the 2:2:2 slit width ratio the width of the intermediate slit does not control the width of the spectral band transmitted through the exit slit, or the energy distribution within the transmitted band. As the width of the intermediate slit is increased, the only effect is to transmit through the intermediate slit more light of the wave lengths adjacent the center wave length, but the spectral purity and width of the band of light transmitted through the exit slit remains unchanged. There are limits, of course, to the possible variation in the width of the intermediate slit. It may not be made narrower than the entrance and exit slits without affecting the band of light transmitted through the exit slit, and its width may not be increased indefinitely because of the stray light problem. However, it has been found that the width of the intermediate slit may be increased up to twice the width of the entrance and exit slits without appreciably affecting the amount of stray light transmitted through the system. Thus, it is apparent that the width of the intermediate slit need not be precisely controlled, as its position is varied to change the center frequency of the band of light transmitted through the exit slit. All that is necessary is that the intermediate slit be maintained wider than the entrance and exit slits, and the costly cam, which was needed in previously known mechanisms, which varied the intermediate slit width, may be replaced by a simple inexpensive lever arrangement.

In addition, the slit arrangement of the invention is not as subject to misalignment as previously known arrangements. For example, if, in the prior arrangement, the exit slit is misaligned by an amount equal to twice its width, the amount of energy transmitted through the exit slit is greatly reduced, and the center wave length of the transmitted band is shifted. If the exit slit in the present invention is misaligned by the same amount, the energy transmitted by the exit slit is reduced, but the center frequency of the band is shifted by a considerably smaller amount than with prior arrangements. In addition, if the width of the intermediate slit is twice the width of the entrance and exit slits, the amount of energy transmitted through the exit slit will be unaffected by such degree of misalignment. Thus the effect of misalignment of the slits is considerably reduced in the present system.

Figure 4:
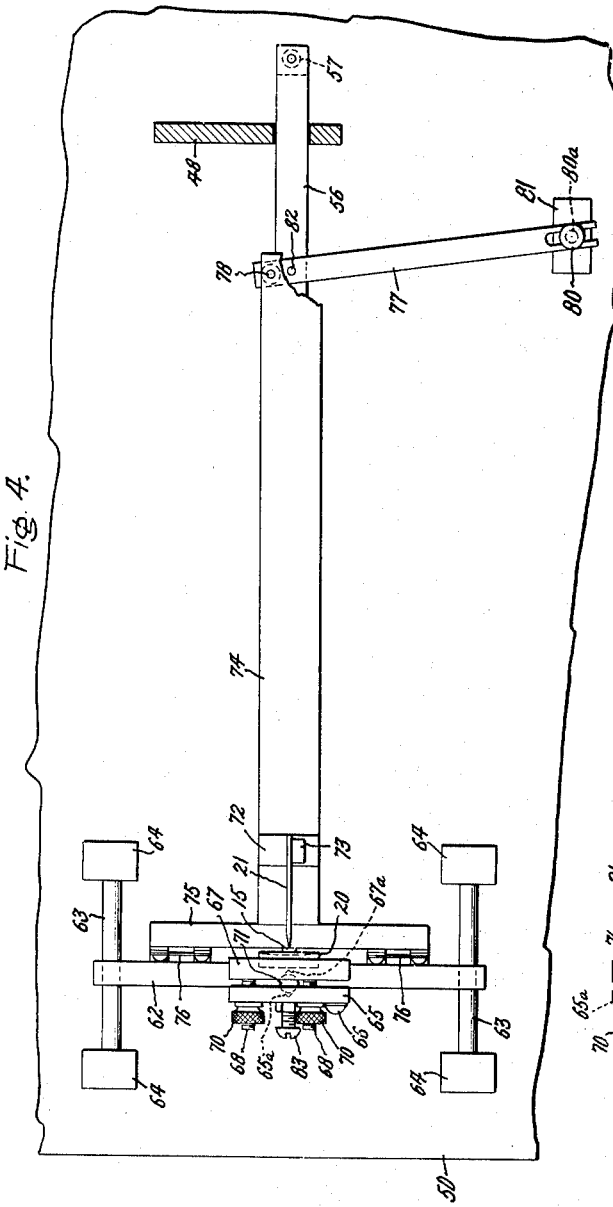
Fig. 4 is a plan view of the intermediate slit mechanism.
Figure 5:
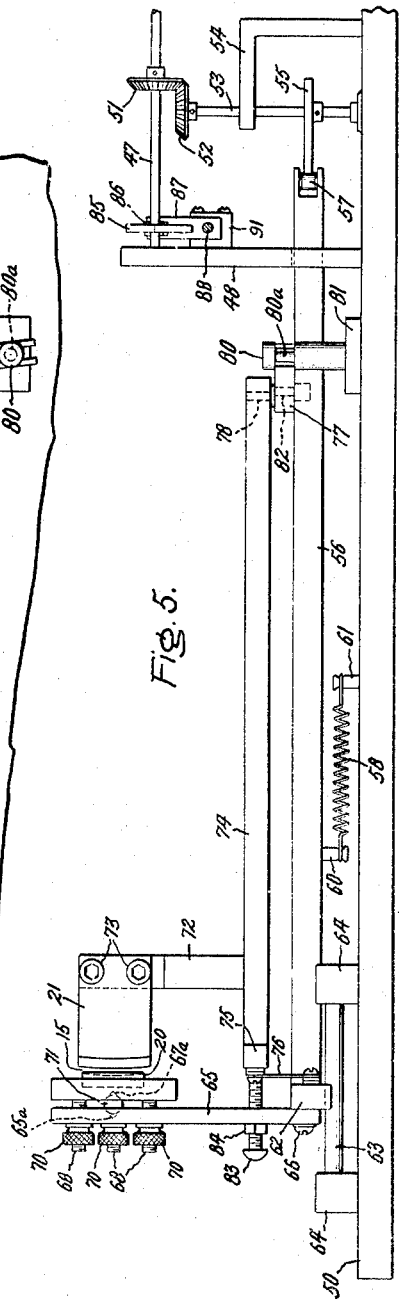
Fig. 5 is a view in side elevation of the intermediate slit mechanism shown in Fig. 4, also showing the mechanism which interconnects the intermediate slit with the entrance and exit slits.

The means by which the position of the intermediate slit is varied to control the wave length of the band transmitted by the exit slit and the means by which the widths of the three slits are simultaneously adjusted are shown in Figs. 4, 5, and 6. As previously mentioned, the wave length motor 43 drives both the recorder drum 42 and the mechanism which varies the wave length of the monochromatic light and the widths of the three slits, and as the motor 43 rotates at constant speed and drives the recorder at constant speed, it is necessary that the wave length of the monochromatic light transmitted through the exit slit vary linearly. Thus, the carriage 22, on which are mounted the mirror 20 and blade 21 comprising the intermediate slit, must have its position varied non-linearly, because, as previously mentioned, the variation of the index of refraction of the first prism with the wave length of the incident light is not constant. As the recorder drum 42 is rotated by the wave length motor 43, it drives a horizontal shaft 47, which is rotatably mounted in a support 48 attached to a base plate 50, and the shaft 47 has secured thereto a bevel gear 51 which meshes with a similar gear 52 mounted on a vertical shaft 53. The vertical shaft 53 may be mounted in any convenient manner, such as by having one end rotatably supported in suitable bearings in the base plate 50 with a bracket 54 also supporting the shaft below the bevel gear 52. A wave length cam 55 is also secured to the shaft 53, and is the element whose rotation actually moves the carriage 22 on which the intermediate slit is mounted.

The intermediate slit carriage 22 comprises a bar 56 having a roller 57 rotatably mounted in a slot cut in one end thereof, which is urged against the cam 55 by a spring 58 mounted under tension between posts 60 and 61 attached to the bar 56 and the base plate 50, respectively. A cross piece 62 is secured to the other end of the bar 56, and the cross piece 62 is slidably supported on rails 63, which are mounted in blocks 64 secured to the base plate 50. If desired, the bottom surface of the cross piece 62 may be notched at the points where it rests on the rails 63, in order to maintain the transverse alignment of the mechanism as it is reciprocated by longitudinal movement of the bar 56. An upright member 65, which actually supports the mirror 20, is secured to the cross piece 62 by screws 66. The mirror 20 is secured in a mounting 67, and the mounting 67 is adjustably attached to the upright member 65. The mirror mounting 67 is supported on the upright by means of three mounting screws 68, equally spaced about the periphery of the mirror, and each provided with an adjusting nut 70. The ends of the screws 68 are secured in the mounting 67 and the screws extend through apertures in the upright 65. The mounting 67 is spaced from the upright 65 by a ball 71, which is retained in notches 65a and 67a cut into the upright and the mirror mounting, respectively. Thus, as the nuts 70 are adjusted, the plane of the mirror 20 may be rotated about the ball 71, in order to align the optical system.

The blade 21, which forms the second element of the intermediate slit, is mounted on the carriage 22 in such a way that it is movable relative to the mirror 20 in order to vary the width of the slit. The blade 21 is mounted on an upright member 72 by means of screws 73, and the lower end of the upright member 72 is secured to a horizontal bar 74. The end of the bar 74 nearest the slit has secured thereto a cross piece 75, and the bar 74 and cross piece 75 are supported above the cross piece 62 by means of leaf springs 76 secured to the cross piece 75 near its ends and to the cross piece 62. The leaf springs 76 permit the horizontal bar 74 to move longitudinally, while it is retained in substantial alignment in vertical and transverse directions. The other end of the horizontal bar 74 is supported on a lever arm 77, to which it is rotatably secured near one end thereof by a pivot pin 78. The other end of lever arm 77 is slotted, and it rides in a reduced portion 80a of a pivot pin 80, which is mounted on a block 81 attached to the base plate 50. The lever arm 77 is also rotatably attached to the longitudinal bar 56, by means of a pivot pin 82 located inwardly from the pivot pin 78. Thus, if longitudinal bar 56 is caused to move to the left, as seen in Figs. 4 and 5, the lever arm 77, which is joined thereto by the pivot pin 82 is caused to rotate in a counterclockwise direction about pivot pin 80. Because the horizontal bar 74 is also attached to the lever arm 77 by pivot pin 78, which is located a greater distance from pivot pin 80 than is pin 82, bar 74 is also caused to move to the left, but by a greater amount than bar 56. Therefore, as the bar 56 is moved toward the left, the blade 21 moves closer to the mirror 20, and the width of the intermediate slit 15 is decreased. Similarly, if the bar 56 is moved toward the right, the width of slit 15 is increased. In order to prevent damage to the mirror 20, movement of the blade 21 toward the mirror is limited by a stop screw 83 and locknut 84, the screw 83 being threaded through the upright member 65 in position to bear against the cross piece 75 and limit the movement of the blade toward the mirror.

It is noted that movement of the horizontal bar 74 with respect to bar 56 is not truly linear, but is actually a sine wave motion. However, when the range of movement of the bars is small, as is the case in actual practice, movement of the arm 74 relative to bar 76 may be said to be linear, for all practical purposes. This type of movement is entirely satisfactory in the present instance, because, as was pointed out previously, the width of the intermediate slit 15 is not critical, so long as it remains wider than the entrance and exit slits. The primary purpose in varying the width of the intermediate slit as the band of light transmitted therethrough varies throughout the spectrum, is to limit the amount of stray light entering the system through the slit. Were it not for the question of stray light, the intermediate slit 15 could be set at a constant width and left undisturbed as the center wave length varies throughout the entire spectrum.

The wave length cam 55 is cut according to well-known principles, so that as the shaft 53 and the wave length cam rotate at constant speed, the center wave length of the band of light passing through the intermediate slit 15 also varies at a constant rate. In normal operation, the band of light transmitted through the exit slit varies progressively through the spectrum from blue to red; that is, the wave length of the transmitted light progressively increases. At the blue end of the spectrum, the wave length cam 55 positions the intermediate slit carriage 22 at the right end of its range (as seen in Figs. 4 and 5), and the slit 15 is at its maximum width. As the wave length cam 55 rotates, it moves the longitudinal bar 56 to the left to pass through the intermediate slit a spectral band of increasingly longer wave length, because, as is well known, the deviation of light by a prism decreases with increasing wave length. As the intermediate slit carriage 22 is moved to the left, thus passing light of increasingly longer wave length, the action of lever arm 77 causes the intermediate slit width to decrease.

It was previously pointed out that the width of the entrance and exit slits controls the width of the spectral band of light transmitted through the exit slit, or, in other words, the width of the entrance and exit slits controls the spectral purity of the band of light transmitted through the exit slit. Therefore, if the width of the spectral band transmitted through the exit slit is to be kept constant, and the plot of the characteristics of the sample being investigated to be meaningful, the widths of the entrance and exit slits must vary as the movement of the intermediate slit carriage 22 causes the center wave length of the band of light being transmitted through the exit slit to vary throughout the spectrum. The entrance and exit slit width varying mechanism, which is shown in Fig. 6, is controlled by the shaft 47, which also controls the movement of the intermediate slit. The shaft 47 has mounted thereon a cam 85 cut according to well-known principles, which is engaged by a roller 86 rotatably mounted in the slotted end of a follower plate 87, which is secured to a rod 88. The rod 88 is slidably supported in blocks 90, 91, and 92, attached to the support 48, and a spring 93 surrounds the rod 88 and is compressed between the follower plate 87 and the support 91 to urge the roller 86 against cam 85.

Looking first at the entrance slit 12, it is seen that the various moving parts of the slit are supported on a plate 94, which is milled out to provide horizontal channels 94a and 94b and a broad vertical channel 94c. A rectangular aperture 95 is cut in the plate 94 midway between the channels 94a and 94b, and the longer dimension of the rectangle defines the height of the entrance slit, whose edges are formed by blades 96 and 97. The blade 96 is attached to a member 98, which slidably fits into channel 94a, and the blade 97 is attached to a member 100, which similarly fits into channel 94b. A small coil spring 101, which extends into the end of channel 94a through a bore in the plate 94 and is held in position by a set screw 102, bears against the end of the member 98, and urges a pin 103, secured to the other end of the member 98, against a lever 104 near one end thereof. The lever 104 is set into the channel 94c and is pivotable about a pin 105, which is attached to the plate 94 and on which a notch 194a cut into lever 104 is seated. The lever 104 is engaged near its other end by a pin 106, attached to one end of the member 100, and the rod 88 enters the channel 94b through a bore in the plate 94 and bears against the other end of the member 100. Thus, it is seen that the spring 101 urges the blade 96 to the left and, through the action of lever 104, simultaneously urges blade 97 toward the right, thus tending to maintain the slit 12 in its narrowest condition.

The construction of the exit slit 18 is similar to that of the entrance slit 12, but the construction of the two slits is not identical. The parts of the exit slit 18 are supported on a plate 107, milled out to provide a channel having horizontal arms 107a and 107b and a broad vertical portion 107c. A rectangular aperture 108 cut in the plate 107 defines the height of the slit and the width of the slit is determined by blades 110 and 111, the blade 110 being attached to a member 112 which slidably fits into channel 107a, and the blade 111 being attached to a member 113 which similiarly fits into channel 107b. A small coil spring 114, which enters the channel 107a through a bore in the plate 107 and is held in position by set screw 115, bears against one end of the member 112. The other end of member 112 has a pin 116 secured thereto, which bears against a lever 117 near one end thereof. The lever 117 lies in the broad portion 107c of the channel in plate 107 and is pivotable about a pin 118, which is attached to the plate 107 and on which a notch 117a cut into the lever 117 rides. The other end of lever 117 bears against a pin 120 secured to the end of member 113, and the other end of member 113 is engaged by the end of rod 88 which enters the channel 107b through a bore in the plate 107. The spring 114 urges blade 110 toward the right, and, through the action of lever 117, the blade 111 is urged toward the left. Thus, the spring 114 tends to maintain the slit 18 in its widest condition.

In operation, as the driving shaft 47 rotates in a counter-clockwise direction (Fig. 6), the intermediate slit carriage 22 is moved to the left (Fig. 5) and the width of the intermediate slit 15 is decreased, in the manner previously explained. As the shaft 47 rotates, the cam 85, acting through roller 86 and follower plate 87, causes the rod 88 connecting the entrance and exit slits to move toward the right (Fig. 6). As the rod 86 moves to the right and the left end of the rod tends to pull away from the member 100, spring 101 acting through member 98 causes the lever 104 to pivot in a counter-clockwise direction about pin 105, thus moving blade 96 to the left and blade 97 to the right and narrowing the slit 12. The width of the slit is determined, of course, by the amount that the rod 88 is moved toward the right.

At this same time, the right end of the rod 88 pushes against the end of member 113 in the exit slit mechanism, and causes the lever 117 to pivot in a counter-clockwise direction about the pivot pin 118. Thus, the blade 111 is moved toward the right, and blade 110 is moved toward the left, and the exit slit 18 is narrowed by the same amount as the entrance slit 12.

The various parts of the entrance and exit slit mechanisms are so constructed that the two slits defined by the blades are equal in width, and, as the cam 85 rotates, the positions of the four blades are all varied by equal amounts. Thus, the slits are always of equal width and are symmetrical with respect to their center lines, which lie on the optic axis of the system.

It is now apparent that the present invention provides a spectrophotometer having an optical system which is greatly improved over those previously known. The flux passing through exit slit 18 has been approximately doubled, as compared to that of previous instruments, by the use of the novel ratio of slit widths, and is of high spectral purity. In addition, approximately twice as much of the light which strikes the sample, and standard is received by the photocell as was previously possible, and the amount of noise contributed by the flicker device has been substantially reduced. Thus, the signal-to-noise ratio of the instrument has been greatly improved, with resultant improvement in instrument sensitivity.

Various changes and modifications may be made by one skilled in the art without departing from the spirit of the invention, and it is intended to be limited only by the scope of the appended claims.

What I claim as new and desire to secure by Letters Patent of the United States is:

1. A spectrophotometer comprising in optical alignment a light source, a variable width entrance slit, a first spectrum forming means, an intermediate slit consisting of a mirror and slit defining member both mounted on a movable carriage and also movable relative to each other to vary the effective width of said intermediate slit, second spectrum forming means, a variable width exit slit, driving means for moving the carriage to cause the exit slit to transmit a band of light whose center frequency varies progressively through the spectrum, means connecting said driving means, said entrance slit, said slit defining member of said intermediate slit and said exit slit for varying non-linearly the widths of said entrance and exit slits and for varying substantially linearly the effective width of said intermediate slit as said center frequency varies linearly with movement of said carriage whereby to maintain the spectral width of the band of light transmitted by said exit slit constant throughout the spectrum, the widths of the entrance and exit slits being equal and the effective width of said intermediate slit being not less than the width of said entrance and exit slits whereby the width of said entrance and exit slits alone controls the spectral width of the band of light transmitted by said exit slit, a photometering prism for plane polarizing said light, means for splitting said polarized light into two diverging beams of light plane polarized at right angles to each other, a flicker device in the path of the two beams for causing the beams to emerge therefrom varying in intensity from zero to maximum in opposite phase, means for causing one of said beams to strike a sample and the other of said beams to strike a standard, integrating means for receiving light from said sample and said standard, a photocell receiving the integrated light, and means controlled thereby for varying the position of the photometering prism until the integrated light from the sample and standard shows no fluctuation at flicker frequency.

2. Apparatus comprising in combination and in optical alignment a light source, a variable width entrance slit, first spectrum forming means, an intermediate slit comprising a pair of slit defining members mounted on a movable carriage and movable relative to each other to vary the effective width of said intermediate slit, second spectrum forming means, a variable width exit slit, driving means for moving said carriage to cause the exit slit to transmit a band of light whose center frequency varies progressively through the spectrum, means connecting said driving means, said entrance slit and said exit slit for varying non-linearly the widths of said entrance and said exit slits as said center frequency varies linearly with movement of said carriage to maintain the spectral width of the band of light transmitted by said exit slit constant throughout the spectrum, means connecting said driving means and at least one said intermediate slit defining member for varying linearly the effective width of said intermediate slit as said center frequency varies linearly with movement of said carriage, the widths of the entrance and exit slits being maintained substantially equal and the effective width of said intermediate slit being not less than the width of said entrance and exit slits whereby the width of said entrance and said exit slits alone controls the spectral width of the band of light transmitted by said exit slit.

3. Apparatus comprising in combination and in optical alignment a light source, a variable width entrance slit, first spectrum forming means, an intermediate slit comprising a pair of slit defining members mounted on a movable carriage and movable relative to each other to vary the effective width of said intermediate slit, second spectrum forming means, a variable width exit slit, driving means for moving said carriage to cause the exit slit to transmit a band of light whose center frequency varies progressively through the spectrum, means connecting said driving means, said entrance slit and said exit slit for varying non-linearly the widths of said entrance and said exit slits as said center frequency varies linearly with movement of said carriage to maintain the width of the spectral band of light transmitted by said exit slit constant throughout the spectrum, a lever interconnecting said carriage driving means and at least one said intermediate slit defining member for varying linearly the effective width of said intermediate slit as said center frequency varies linearly with movement of said carriage, the widths of the entrance and exit slits being maintained substantially equal and the effective width of said intermediate slit being not less than the width of said entrance and exit slits whereby the width of said entrance and said exit slits alone control the spectral width of the band of light transmitted by said exit slit.

References Cited in the file of this patent

UNITED STATES PATENTS

| | | |
|---|---|---|
| 2,157,389 | Park | May 9, 1939 |
| 2,227,510 | Pineo | Jan. 7, 1941 |
| 2,328,293 | Pineo | Aug. 31, 1943 |
| 2,450,761 | MacNeille | Oct. 5, 1948 |
| 2,654,287 | Luft | Oct. 6, 1953 |
| 2,660,086 | Foreman et al. | Nov. 24, 1953 |

FOREIGN PATENTS

| | | |
|---|---|---|
| 438,511 | Great Britain | Nov. 19, 1935 |